(12) United States Patent
Kostek

(10) Patent No.: US 10,327,439 B1
(45) Date of Patent: Jun. 25, 2019

(54) ANIMAL SCENT EMITTING DEVICE

(71) Applicant: Chris Kostek, Merrifield, MN (US)

(72) Inventor: Chris Kostek, Merrifield, MN (US)

(73) Assignee: Christopher Kostek, Springfield, MN (US)

( * ) Notice: Subject to any disclaimer, the term of this patent is extended or adjusted under 35 U.S.C. 154(b) by 0 days.

(21) Appl. No.: 15/715,270

(22) Filed: Sep. 26, 2017

(51) Int. Cl.
*A01M 31/00* (2006.01)
(52) U.S. Cl.
CPC .................................. *A01M 31/008* (2013.01)
(58) Field of Classification Search
CPC .................................................... A01M 31/008
See application file for complete search history.

(56) References Cited

U.S. PATENT DOCUMENTS

| | | | | |
|---|---|---|---|---|
| 2,086,631 A * | 7/1937 | Munro | .................... | A63H 33/00 119/711 |
| 5,611,165 A * | 3/1997 | Blaha | .................. | A01M 31/008 239/58 |
| 6,199,311 B1 * | 3/2001 | Foster | ................. | A01M 31/008 102/506 |
| 9,259,499 B2 * | 2/2016 | Atkinson | ................. | A61L 9/127 |
| 2013/0192119 A1 * | 8/2013 | Zimmerman | ....... | A01M 31/008 43/2 |
| 2014/0310996 A1 * | 10/2014 | Waters | ................. | A43B 3/0031 36/136 |
| 2015/0296768 A1 * | 10/2015 | Hays | ....................... | H04W 4/70 340/573.2 |
| 2017/0332619 A1 * | 11/2017 | Cummins | ........... | A01M 31/008 |
| 2018/0279604 A1 * | 10/2018 | Ratcliff | ............... | A01M 31/008 |

* cited by examiner

*Primary Examiner* — J C Jacyna
(74) *Attorney, Agent, or Firm* — Chris Kostek

(57) ABSTRACT

A animal scent emitting device for rapid and economical dispensing of an animal scent without it being contaminated with human scent. The animal scent emitting device includes a shell capable of holding animal fluids inside thereof; a weight member fastened to the shell; and a cap removably engaged to the shell.

5 Claims, 2 Drawing Sheets

ANIMAL SCENT EMITTING DEVICE

BACKGROUND OF THE INVENTION

Field of the Invention

The present invention relates to scent dispensers and more particularly pertains to a new animal scent emitting device for rapid and economical dispensing of an animal scent without it being contaminated with human scent.

Description of the Prior Art

The use of scent dispensers is known in the prior art. More specifically, scent dispensers heretofore devised and utilized are known to consist basically of familiar, expected and obvious structural configurations, notwithstanding the myriad of designs encompassed by the crowded prior art which have been developed for the fulfillment of countless objectives and requirements.

The prior art describes a carrying projectile means such as a pellet for a projectile delivery means such as a carbon dioxide operated gun and fired from a distance to the desired location. Another prior art describes a cage, a discharge housing carried by the cage, a vinegar syringe having a discharge tip carried by the discharge housing, a spoon pivotally carried by the discharge housing and engaging the vinegar syringe and a paint bladder carried by the cage. Also, another prior art includes a projectile launching member, a projectile storage unit that has a sufficient size to store a predetermined number of the projectiles, and a single projectile dispensing unit. The single projectile dispensing unit is integral with the projectile storage unit and is capable of dispensing a single projectile of the plurality of projectiles to the projectile launching member while retaining all of the plurality of projectiles in the projectile storage unit, except for the single projectile. grenade that disperses a marking fluid upon impact. Further, another prior art includes a grenade having a flexible, resilient tube sealed at both ends. While these devices fulfill their respective, particular objectives and requirements, the aforementioned patents do not disclose a new animal scent emitting device.

SUMMARY OF THE INVENTION

The general purpose of the present invention, which will be described subsequently in greater detail, is to provide a new animal scent emitting device which has many of the advantages of the scent dispensers mentioned heretofore and many novel features that result in a new animal scent emitting device which is not anticipated, rendered obvious, suggested, or even implied by any of the prior art scent dispensers, either alone or in any combination thereof. The present invention includes a shell capable of holding animal fluids inside thereof; a weight member fastened to the shell; and a cap removably engaged to the shell. None of the prior art includes the combination of the elements of the present invention.

There has thus been outlined, rather broadly, the more important features of the animal scent emitting device in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new animal scent emitting device which has many of the advantages of the scent dispensers mentioned heretofore and many novel features that result in a new animal scent emitting device which is not anticipated, rendered obvious, suggested, or even implied by any of the prior art scent dispensers, either alone or in any combination thereof.

Still another object of the present invention is to provide a new animal scent emitting device for rapid and economical dispensing of an animal scent without it being contaminated with human scent.

Still yet another object of the present invention is to provide a new animal scent emitting device that effectively wobbles about upon the ground to eject animal fluids in the environment to attract like animals.

Even still another object of the present invention is to provide a new animal scent emitting device that is reusable and easy to fill and can be tossed and upon landing on a ground, eject animal fluids are ejected from the device as it wobbles about on the ground.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
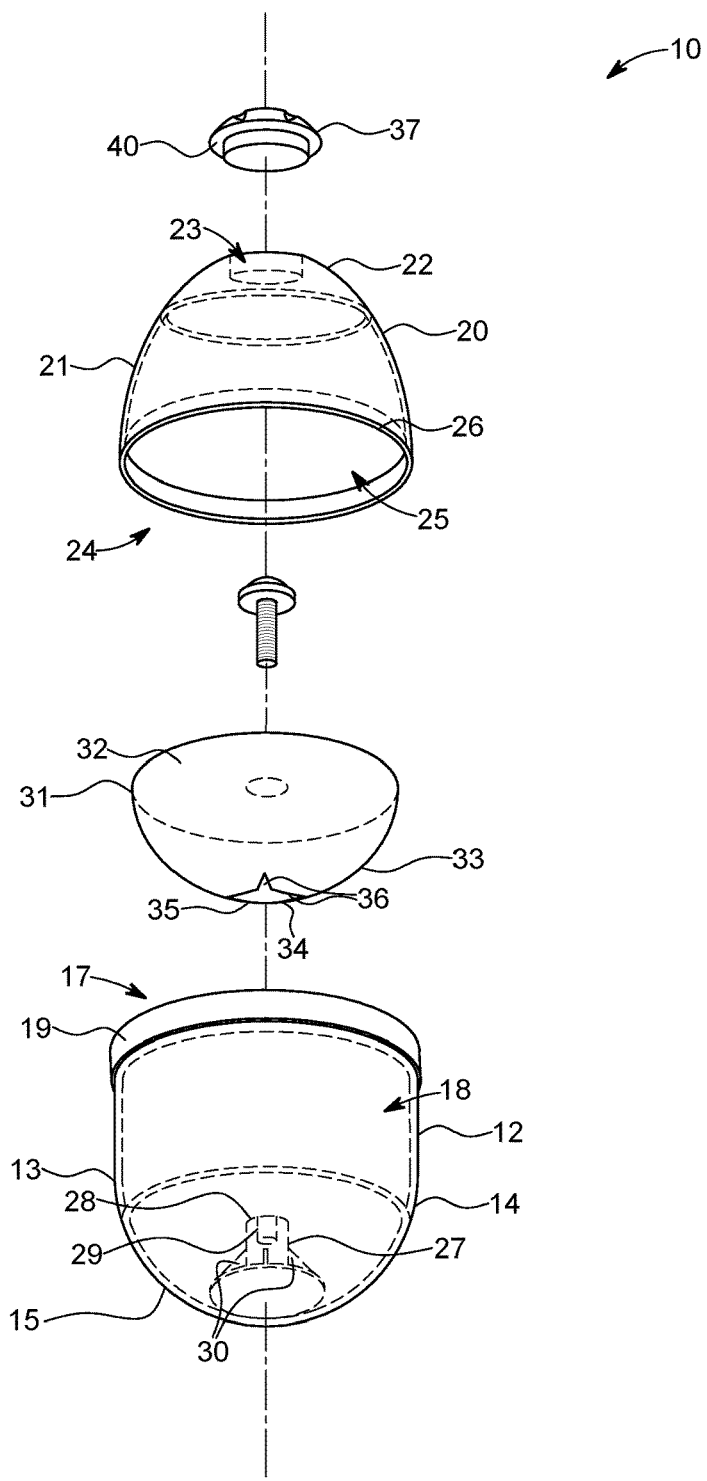
FIG. 1 is an exploded bottom perspective view of a new animal scent emitting device according to the present invention.
Figure 2:
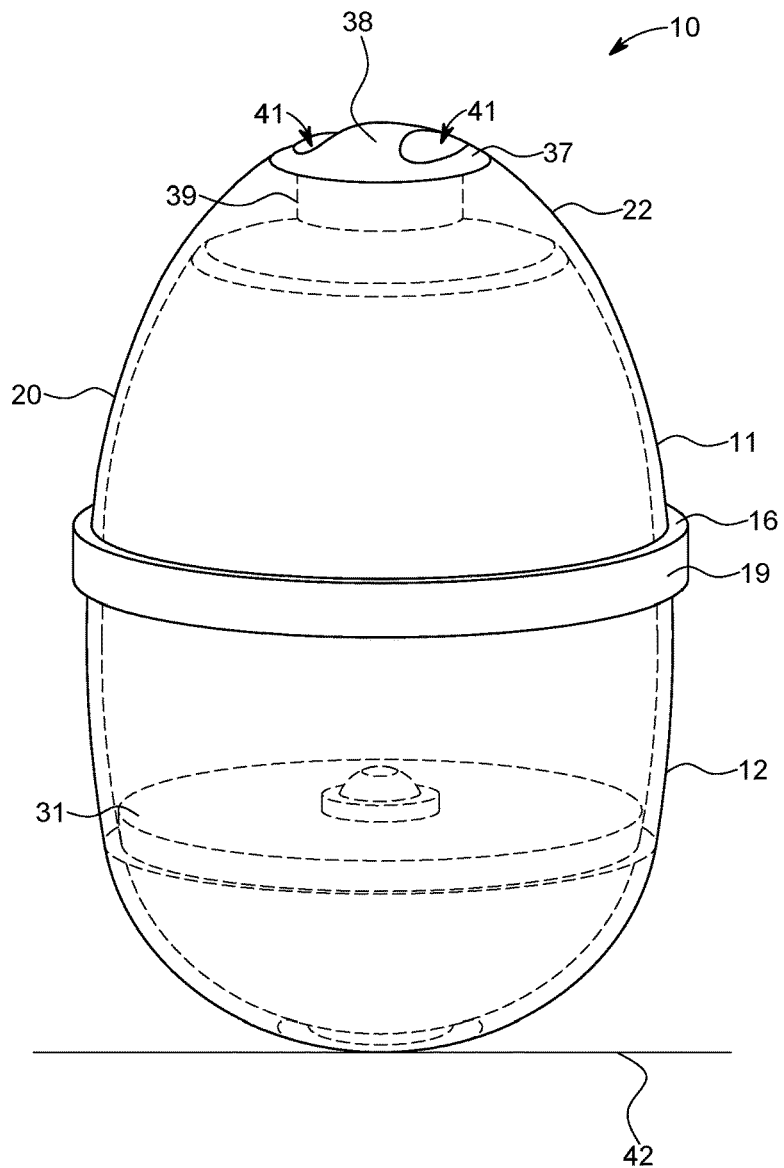
FIG. 2 is a top perspective view of the present invention.

With reference now to the drawings, and in particular to FIGS. 1 and 2 thereof, a new animal scent emitting device embodying the principles and concepts of the present invention and generally designated by the reference numeral 10 will be described.

As best illustrated in FIGS. 1 and 2, the animal scent emitting device 10 generally comprises a shell 11 capable of holding animal fluids inside thereof; a weight member 31 conventionally fastened to the shell 11; and a cap 37 removably engaged to the shell 11.

The shell 11 has a base section 12 and a top section 20 removably secured to the base section 12. The base section 12 has a lower portion 14 which is beveled downwardly and inwardly to facilitate wobbling of the shell 11 upon a ground surface to eject the animal fluids from the shell 11. The base section 12 has a perimeter wall 13, an open top 17 with a cavity 18 disposed therein through the open top 17. The perimeter wall 13 has a bottom portion 15 for resting upon a ground and a top edge 16. The shell 11 has a collar integrally disposed outwardly and upwardly along and from the top edge 16 of the perimeter wall 13.

The top section 20 has a perimeter wall 21, an open bottom 24 and a cavity 25 disposed therein through the open bottom 24. The perimeter wall 21 of the top section 20 has an apex 22 with an opening 23 disposed therethrough, and also has a bottom edge 26 which is removably engaged with the collar 19 to secure the top section 20 to the base section 12 and form the shell 11.

The shell 11 also has a support member 27 disposed in the cavity 18 of the base section 12 and integral to and extending upwardly from the bottom portion 15. The support member 27 has a top end 28 with a threaded bore 29 disposed in the support member 27 through the top end 28. The shell 11 also has braces integrally attached to the support member 27 and to the bottom portion 15.

The weight member 31 has a top 32 and a bottom 33 and also a bore 34 extending therethrough. The weight member 31 is tapered inwardly from the top 32 to the bottom 33 to fit in the cavity 18 of the base section 12 and upon the bottom portion 15 of the perimeter wall 13 of the base section 12. The weight member 31 has slots 36 disposed in the bottom 33 and in a wall 35 of the bore 29. The support member 27 is removably received through the bottom 33 and in the bore 34 of the weight member 31 with the braces 30 received in the slots 36. The weight member 31 is conventionally fastened to the support member 27 in the cavity 18 of the base section 12 of the shell 11 to facilitate wobbling of the shell 11 upon the ground to expel the animal fluids through the opening 23 in the top section 20.

The cap 37 has a top wall 38 and a side wall 39 integrally depending from the top wall 38 and is removably engaged in the opening 23 of the top section 20. The cap 37 also has finger holds 41 recessed in the top wall 38 for removing the cap 37 from the shell 11. The top wall 38 has a perimeter portion 40 extending outwardly beyond the side wall 39 to effectively close the opening 23 in the shell 11.

In use, the cap 37 is removed from the shell 11 and the selected animal fluid is put into the shell 11 through the opening 23. The user tosses the shell 11 into a selected area and upon landing upon the ground, the shell 11 wobbles about due to the shape of the base section 12 and to the weight member 31. As it wobbles the animal fluid is dispensed from the shell 11 through the opening 23 and about the selected area with the scent of the animal fluid attracts animals to the scent spread about upon the selected area.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the animal scent emitting device. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An animal scent emitting device comprising:
   a shell capable of holding animal fluids inside thereof, wherein the shell has a base section and a top section removably secured to the base section, wherein the base section has a perimeter wall, an open top with a cavity disposed therein through the open top, wherein the perimeter wall has a bottom portion and a top edge, wherein the shell also has a support member disposed in the cavity of the base section and integral to and extending upwardly from the bottom portion, wherein the shell also has braces integral to the support member and to the bottom portion;
   a weight member fastened to the shell; and
   a cap removably engaged to the shell.

2. The animal scent emitting device as described in claim 1, wherein the weight member has a top and a bottom and also a bore extending therethrough.

3. The animal scent emitting device as described in claim 2, wherein the weight member is tapered inwardly from the top to the bottom.

4. The animal scent emitting device as described in claim 2, wherein the weight member has slots disposed in the bottom and in a wall forming the bore, wherein the support member is removably received through the bottom and in the bore of the weight member with the braces received in the slots, wherein the weight member is fastened to the support member in the cavity of the base section of the shell to facilitate wobbling of the shell upon the ground to expel the animal fluids through the opening in the top section.

5. An animal scent emitting device comprising:
   a shell capable of holding animal fluids inside thereof, wherein the shell has a base section and a top section removably secured to the base section, wherein the base section has a perimeter wall, an open top with a cavity disposed therein through the open top, wherein the perimeter wall has a bottom portion and a top edge, wherein the top section has a perimeter wall, an open bottom and a cavity disposed therein through the open bottom, wherein the perimeter wall of the top section has an apex with an opening disposed therethrough;
   a weight member fastened to the shell; and
   a cap removably engaged to the shell, wherein the cap has a top wall and a side wall depending from the top wall and is removably engaged in the opening of the top section, wherein the cap also has finger holds recessed in the top wall for removing the cap from the shell, wherein the top wall has a perimeter portion extending outwardly beyond the side wall to effectively close the opening in the shell.

\* \* \* \* \*